(12) United States Patent
Jun et al.

(10) Patent No.: US 8,932,723 B2
(45) Date of Patent: Jan. 13, 2015

(54) LOW EMISSIVITY GLASS COMPRISING DIELECTRIC LAYER AND METHOD FOR PRODUCING THE SAME

(75) Inventors: Youn Ki Jun, Gyeonggi-do (KR); Il Joon Bae, Daejeon (KR)

(73) Assignee: LG Hausys, Ltd., Seoul (KR)

( * ) Notice: Subject to any disclaimer, the term of this patent is extended or adjusted under 35 U.S.C. 154(b) by 154 days.

(21) Appl. No.: 13/394,774

(22) PCT Filed: Sep. 16, 2010

(86) PCT No.: PCT/KR2010/006354
§ 371 (c)(1),
(2), (4) Date: Mar. 7, 2012

(87) PCT Pub. No.: WO2011/037365
PCT Pub. Date: Mar. 31, 2011

(65) Prior Publication Data
US 2012/0171443 A1    Jul. 5, 2012

(30) Foreign Application Priority Data
Sep. 25, 2009 (KR) .................. 10-2009-0091327

(51) Int. Cl.
   B32B 15/04    (2006.01)
   B32B 17/06    (2006.01)
   C23C 14/08    (2006.01)
   C03C 17/36    (2006.01)
(52) U.S. Cl.
   CPC ......... C03C 17/3618 (2013.01); C03C 17/3626 (2013.01); C03C 17/3644 (2013.01); C03C 17/3652 (2013.01); C03C 17/366 (2013.01); C03C 2218/154 (2013.01)
   USPC ........... 428/432; 428/426; 428/433; 428/434; 428/688; 428/689; 428/699; 428/701; 428/702; 204/192.1

(58) Field of Classification Search
   USPC ......... 428/428, 432, 688, 689, 697, 699, 701, 428/702, 426, 433, 434; 204/192.1
   See application file for complete search history.

(56) References Cited

U.S. PATENT DOCUMENTS 4,565,719 A    1/1986  Phillips et al.
8,105,695 B2 *  1/2012  Depauw et al. ............... 428/432

FOREIGN PATENT DOCUMENTS

| JP | 2002-528372 A | 9/2002 |
| JP | 2002-529367 A | 9/2002 |
| JP | 2003-522088 A | 7/2003 |
| WO | WO 2008-113786 A1 | 9/2008 |

* cited by examiner

Primary Examiner — David Sample
Assistant Examiner — Lauren Colgan
(74) Attorney, Agent, or Firm — McKenna Long & Aldridge, LLP

(57) ABSTRACT

Provided is low emissivity glass including a low emissivity layer containing electrically conductive metal; and a composite metal oxide formed on one or both sides of the low emissivity layer and expressed by a following chemical formula 1:

$$TiCeO_x \quad (1)$$

wherein Ti is titanium element, Ce is cerium element, and $O_x$ is oxide. Since the dielectric layer which serves as protecting low emissivity layer of low emissivity glass and reducing emissivity contains the composite metal oxide expressed by the above chemical formula 1, visible light transmissivity can be greatly increased with excellent low emissivity.

12 Claims, 2 Drawing Sheets

LOW EMISSIVITY GLASS COMPRISING DIELECTRIC LAYER AND METHOD FOR PRODUCING THE SAME

This application is a National Stage Entry of International Application No. PCT/KR2010/006354, filed Sep. 16, 2010, and claims the benefit of Korean Application No. 10-2009-0091327, filed on Sep. 25, 2009, which is hereby incorporated by reference for all purposes as if fully set forth herein.

TECHNICAL FIELD

The present invention relates to low emissivity glass comprising one or more dielectric layers and a method for producing the emissivity glass.

BACKGROUND ART

The term low emissivity glass is defined to mean glass which is formed such that it has low emissivity by sputter deposition of electrically conductive metal such as silver. The low emissivity glass is also defined to mean functional glass which has an effect of energy savings of buildings by reflecting solar radiant heat in the summer and preserving energy of infrared light emitted by space heaters in the winter due to specific coatings on a surface of the glass substrate.

As prior art methods of producing the low emissivity glass described above, a method of making a chamber under an oxygen atmosphere by injecting a selected amount of oxygen gas into the chamber and then depositing a dielectric layer on a low emissivity layer by using metal material as a target material, has mostly been used.

The dielectric layer is generally formed by depositing a dielectric thin film comprising a metal oxide on one or both surfaces of the low emissivity layer, so that the dielectric layer is mainly used for the purpose of preventing oxidation of silver contained in the low emissivity layer and improving visible light transmissivity.

In the conventional techniques, metal oxides such as zinc oxide, titanium oxide, tin oxide, and composite metal oxide of tin oxide and zinc oxide are commonly used as those contained in the dielectric layer. However, there have existed problems that the dielectric layer comprising the above mentioned metal oxides is limited in its use in the field in which high visible light transmissivity is necessary because of a relatively low refractive index and that the productivity thereof is lowered because of a low deposition rate at the time of sputter deposition.

DISCLOSURE

This invention is derived from the purpose of solving the problems described above. An object of this invention is to provide a low emissivity glass capable of holding low emissivity and enhancing visible light transmissivity by including specific dielectric layers. Other object of this invention is to provide a method suitable for mass productivity improving highly the deposition rate.

In one embodiment of the invention, there is provided low emissivity glass including a low emissivity layer comprising electrically conductive metal; and a dielectric layer formed on one or both sides of the low emissivity layer and comprising a composite metal oxide expressed by the following chemical formula 1:

$$TiCeO_x \quad (1)$$

wherein Ti is titanium element, Ce is cerium element, and Ox is an oxide.

In another embodiment, the invention, as other means for solving the above problems, provides a method of producing low emissivity glass depositing a dielectric layer on one or both sides of a low emissivity layer comprising an electrically conductive metal by using a composite metal oxide expressed by the following chemical formula 1 as a target material.

This invention is directed to low emissivity glass including a low emissivity layer comprising an electrically conductive metal; and a dielectric layer formed on one or both sides of the low emissivity layer and comprising a composite metal oxide expressed by the following chemical formula 1:

$$TiCeO_x \quad (1)$$

wherein Ti is titanium element, Ce is cerium element, and $O_x$ is an oxide.

Hereinafter, low emissivity glass according to the invention would be described in detail.

As described above, low emissivity glass according to the invention includes a low emissivity layer containing an electrically conductive metal; and a composite metal oxide formed on one or both sides of the low emissivity layer and expressed by the above chemical formula 1.

In this invention the term low emissivity glass is defined to mean glass of exhibiting low emissivity as one kind of energy efficient plate glass. Namely, the low emissivity glass may maintain a selected transmissivity characteristic in the range of visible light and provide good thermal insulating effect due to reduction of emissivity of a coated face by forming a high electrically conductive metal or metal oxide thin film on a normal plate glass.

In the invention the term emissivity is defined to mean a ratio of energy with a particular wavelength absorbed, transmitted and reflected by an object and represent an absorption degree of infrared light in the range of wavelength of infrared light. More specifically, the emissivity in the invention is defined to mean a ratio of infrared light energy absorbed to infrared light energy applied when far infrared light (which corresponds to a wavelength range of about 2,500 to 40,000 nm exhibiting strong heat action) is applied.

According to Kirchhoffs law of thermal radiation, absorptivity is the same as emissivity because infrared light energy absorbed by material is the same as energy being again emitted outside. Since infrared light energy which is not absorbed by an object will reflect on the surface of material, the emissivity has a lower value with an increase in infrared light reflectivity. If the emissivity is expressed in a numerical equation, the following relation is obtained: Emissivity=1–Infrared Light Reflectivity.

Emissivity can be measured by various methods known normally in this field. Measuring method of emissivity is not limited to a specific method, but for example, emissivity can be measured by MK-3 equipment etc. based on the KS2514 standard.

Thermal insulating properties of low emissivity glass may be measured through absorption rate, i.e., emissivity rate for far infrared light exhibiting a strong thermal action.

Emissivity and visible light transmissivity of low emissivity glass according to the invention is not limited specifically, but for example the emissivity may be 0.01 to 0.3, preferably 0.01 to 0.2, more preferably 0.01 to 0.1, and further more preferably 0.01 to 0.08.

When emissivity of low emissivity glass according to the invention is less than 0.01, thermal insulting effect due to the reflection of far infrared light may be enhanced but visible light transmissivity may be deteriorated. On the other hand, when the emissivity thereof is more than 0.3, far infrared light reflectivity is so low that thermal insulating property may be deteriorated.

In addition, visible light transmissivity of low emissivity glass according to the invention is also not limited specifically, but for example the visible light transmissivity may be 75% or more, preferably 80% or more, and more preferably 85% or more.

When visible light transmissivity of the low emissivity glass is less than 75%, it can become hard to provide nice visual field.

As described above, low emissivity glass of the invention exhibits high visible light transmissivity together with low emissivity, and can be used as functional glass which can provide excellent thermal insulating effect and nice visual field.

Meanwhile, a low emissivity layer in low emissivity glass can contain electrically conductive metal and serves as blocking radiation in the range of infrared light since the electrically conductive metal can be contained like this.

The type of the electrically conductive metal is not limited specifically, but for example, the metal can be at least one species selected from the group consisting of Ag, Cu, Au, Al, and Pt. when generally considering electrical conductivity, price, color, and low-emissivity characteristic, etc., it is preferable that silver may be used.

The low emissivity layer may be deposited on a substrate using electrically conductive metal itself as a target material as exemplified above. Specifically, considering the improvement of durability, etc., it may be deposited using electrically conductive metal (which is described above) doped with at least one species selected the group consisting of Ni, Pd, Pt, Cu, and Au, as the target material. In order to enhance a variety of functionality, it may also be deposited using electrically conductive material additionally mixed with other additive materials as the target material.

In addition, the thickness of the low emissivity layer is not specifically limited, but the low emissivity layer may be formed at a variety of thickness within a range where both low emissivity and good visible light transmissivity can be implemented according to the object of the invention. For example, the thickness thereof may be 8 to 35 nm, and preferably 8 to 15 nm.

When the thickness of the low emissivity layer is less than 8 nm, emissivity becomes so high that it may be hard to exhibit thermal insulating effect. On the other hand, when the thickness thereof is more than 35 nm, emissivity may be lowered but visible light reflectivity is relatively too reduced to secure nice visual field.

Meanwhile, low emissivity glass according to the invention may include dielectric layer containing a composite metal oxide expressed by the following chemical formula 1 on one or both sides of the above described low emissivity layer:

$$TiCeOx \qquad (1)$$

wherein Ti is titanium element, Ce is cerium element, and Ox is an oxide.

Preferably, the composite metal oxide means a composite material obtained adding a selected amount of cerium oxide to titanium oxide. The composite metal oxide is used as a target material forming a dielectric layer included in a low emissivity glass according to the invention, thus may have high refractive index and the effect of preventing diffusion of oxygen ions and sodium ions, and may have greatly high deposition rate at the time of the sputter deposition The content of elements included in the composite metal oxide is not specifically limited but for example, the composite metal oxide may contain 80 to 90% titanium oxide and 10 to 20% cerium oxide by weight.

A dielectric layer is deposited for the purpose of preventing oxidation of a low emissivity layer and improving visible light transmissivity thereof. The effect of anti-reflection of the dielectric layer enhances with an increase in the refractive index of dielectric layer.

Herein, the refractive index of the dielectric layer is not specifically limited, but for example, the refractive index for visible light may be 2.4 to 2.8, and especially the refractive index for visible light of 550 nm wavelength may be 2.45 to 2.5.

Herein, the increase of refractive index means the increase of optical thickness at the same physical thickness. Thus, we can increase visible light transmissivity by increasing the degree of freedom of optical design.

The dielectric layer described above is included in low emissivity glass and thus serves as improving resistance to chemicals, resistance to moisture, and abrasion resistance and reducing emissivity of low emissivity glass, together with preventing oxidation of a low emissivity layer and improving visible light transmissivity thereof.

In addition, dielectric layer in low emissivity glass according to the invention may, preferably, include a first dielectric layer formed on the upper surface of the low emissivity layer and a second dielectric layer formed on the lower surface thereof.

The first dielectric layer is formed on the upper surface of low emissivity layer, thus serves as preventing oxidation of the low emissivity layer and improving visible light transmissivity thereof. The second dielectric layer is formed between a substrate and the low emissivity layer, thus acts as preventing both contamination of a substrate surface and contamination of the low emissivity layer due to Na+ ions, etc., together with enhancing the adhesive strength between the substrate and the low emissivity layer and emissivity.

The thickness of the first dielectric layer and the second dielectric layer is also not specifically limited, but for example the first dielectric layer and the second dielectric layer, respectively have a thickness of 10 nm to 100 nm. Preferably, they respectively have a thickness of 30 nm to 40 nm. When the dielectric layer has a thickness of less than 10 nm, a glass face is apt to tarnish. On the other hand, when it has a thickness of more than 100 nm, the visible light transmissivity will be lowered.

Meanwhile, low emissivity glass according to the invention can also include a barrier layer interposed between the low emissivity layer and the first dielectric layer.

The barrier layer serves as preventing electrically conductive metal contained in the low emissivity layer from getting damaged due to a process gas during a sputter deposition process. It can contain metals generally known in this field and especially, for example can contain Ni and Cr.

In addition, a low emissivity glass according to the invention may also include an overcoat layer which is formed on the upper surface of the second dielectric layer The overcoat layer serves as protecting the surface of low emissivity glass and imparting durability on the glass. It is not specifically limited in its kind, but for example nitrides such as silicon nitride (SiN), aluminum containing silicon nitride (SiAlN) and silicon nitride-oxide (SiNOx) may be used.

Furthermore, a low emissivity glass according to the invention may also include an undercoat layer which is formed on the lower surface of the first dielectric layer.

The undercoat layer serves as protecting the substrate of low emissivity glass and imparting durability on the glass. It is not specifically limited in its kind, but for example nitrides such as silicon nitride (SiN), aluminum containing silicon nitride (SiAlN) and silicon nitride-oxide (SiNOx) may be used.

As described above, low emissivity glass according to the invention has excellent thermal insulating properties due to low emissivity and high visible light transmissivity, thus may be widely used as architectural and automotive glass, etc., demanding such thermal insulating effect and secure of nice visual field.

Merely, low emissivity glass according to the invention is not limited to applications described above, but it can be applied to a wide field of glasses demanding high thermal insulating properties and secure of nice visual field.

Composite metal oxide contained in a dielectric layer tends to have greatly high deposition rate at the time of sputter deposition and thus increase process efficiency at the time thereof, compared to metal or metal oxide which has been previously used. Therefore, it can be used more valuably in mass production.

FIG. 1 a schematic cross-sectional view showing multilayered structure of low emissivity glass according to one embodiment of this invention.

As shown in FIG. 1, low emissivity glass 100 according to the invention comprises a multilayer stack structure which comprises, moving outwardly from a glass substrate 110 in a consecutive order: a undercoat layer ($SiN_xO_y$) 120, a first dielectric layer ($TiCeO_x$) 130, a low emissivity layer (Ag) 140, a barrier layer ($NiCrO_x$) 150, a second dielectric layer ($TiCeO_x$) 160 and an overcoat layer ($SiN_xO_y$) 170.

However, this is only one embodiment of the invention. The structure of low emissivity glass according to the invention is not limited to the multilayer stack structure illustrated in FIG. 1.

Meanwhile, the invention is directed to a method comprising steps of depositing a dielectric layer on one or both sides of low emissivity layer comprising electrically conductive metal, using a composite metal oxide expressed by the following chemical formula 1 as a target material:

$$TiCeO_x. \qquad (1)$$

wherein Ti is titanium element, Ce is cerium element, and $O_x$ is an oxide.

Since the method of producing low emissivity glass according to the invention, as described above, comprises depositing a dielectric layer on a low emissivity layer using the composite metal oxide expressed by the above chemical formula 1 as a target material, a deposition rate is greatly high. Accordingly, the method may be used more suitably for mass production.

Deposition in the invention especially means a sputter deposition. During the deposition, specific process conditions are not especially limited, but for example deposition in a production method for glass according to the invention may be performed at the process pressure of $5\times10^{-2}$ Torr to $5\times10^{-8}$ Torr under vacuum condition.

The term vacuum condition in the invention is defined to mean a process pressure condition creating a vacuum atmospheric state, but for example, deposition may be performed at a process pressure of $5\times10^{-2}$ Torr to $5\times10^{-8}$ Torr under vacuum condition.

When a process pressure is less than $5\times10^{-2}$ Torr, film qualities are apt to be deteriorated since deposition material with high energy impacts on the substrate. On the other hand, when a process pressure exceeds $5\times10^{-8}$ Torr, the mean free path of a particle is reduced, so that the deposition can be difficult.

In addition, a process gas introduced during the deposition process can be supplied, the process gas being one species or a mixed gas comprising at least two kinds of gases normally used in this field. The process gas is not specifically limited in its kind, but for example can include a nitrogen gas, an inert gas such as an argon gas and an oxygen gas.

More specifically, for example in the production method for low emissivity glass according to the invention a process gas injected at the time of depositing a dielectric layer can include an argon gas and an oxygen gas. The charges of the process gas is not specifically limited, but for example argon gas at a flow rate of 20 sccm (Standard Cubic Centimeter per minute) to 40 sccm and oxygen gas at a flow rate of 10 sccm to 20 sccm can be introduced.

In addition, a method for depositing the dielectric layer is not also limited specifically but any method which can deposit the dielectric layer on the low emissivity layer using the composite metal oxide described above as a target material under a vacuum condition among deposition methods known in this filed can be included. However, for example the resistance heating deposition method, the electron beam deposition method, the laser beam deposition method, the plasma sputtering method, etc., can be used and preferably the plasma sputtering method can be used.

When the plasma sputtering method is used, film of uniform quality can be obtained and adhesion force of film is high. Films Of various materials such as metal, alloy, compound, and insulator can be formed. The target can be cooled and a large scale of target can be used. As a result, the plasma sputtering method is suitable for producing glass of a large sized film.

The plasma sputtering method such as DC sputtering, RF sputtering, magnetron sputtering, and reactive sputtering can be used.

Meanwhile, when the plasma sputtering method is used, the deposition of the dielectric layer may be performed at applied power of 1 w/cm$^2$ to 5 w/cm$^2$.

When the applied power is less than 1 w/cm$^2$, the deposition rate is low and thus productivity is reduced. The adhesion between the dielectric layer being deposited and the substrate or the low emissivity layer is also loose. On the other hand, when the applied power exceeds 5 w/cm$^2$, the substrate or the low emissivity layer may be damaged, or the target material may become damaged or melted. Accordingly, the process apparatus may be severely damaged.

Regarding the method for producing low emissivity glass using plasma sputtering technique as described above, a more detailed explanation will be given: First, argon gas and oxygen gas is introduced into a vacuum chamber at an adequate amount and a voltage can be applied to a cathode where a target material is installed. At this time, electrons released from the cathode collide with gas atoms of Ar gas, thereby ionizing Ar gas atoms to Ar$^+$ ions. At that time, Electrons are released with argon being excited and thus energy is emitted. Therefore, glow discharge is created. Due to the glow discharge, plasma is formed where ions and electrons coexist.

Ar$^+$ ions in the plasma are accelerated towards the cathode i.e., the composite metal oxide due to the large potential difference to collide with the surface of the target. As a result, target atoms are sputtered and the dielectric layer can be formed by depositing the layer on the low emissivity layer.

[Detailed Description of Main Elements]

Figure 1:
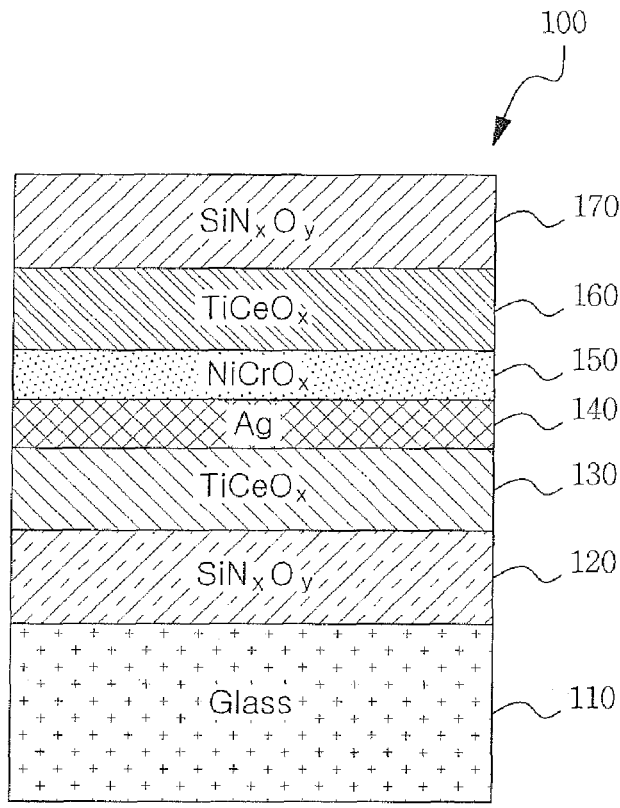
FIG. 1 a schematic cross-sectional view showing multilayered construction of low emissivity glass according to one embodiment of this invention.

100: low emissivity glass  
110: substrate  
130: first dielectric layer  
140: low emissivity layer  
160: second dielectric layer  
170: overcoat layer  
11: undercoat layer  
120: low emissivity layer  
150: barrier layer

MODE FOR INVENTION

The advantages, features and aspects of the invention will become apparent from the following description of the embodiments with reference to the accompanying drawings, which is set forth hereinafter.

Hereinafter, the invention will be further explained through the embodiments according to the invention and the comparative embodiments in the prior art. The scope of the invention would be not limited to embodiments described below.

Embodiment 1

Substrate of conventional soda lime glass (having a thickness of 0.7 mm) was obtained. The glass substrate was coated with an undercoat layer, a first dielectric layer, a low emissivity layer, a barrier layer, a second dielectric layer, and an overcoat layer in consecutive order, moving outwardly from the glass substrate according to the conditions of the following Table 1 by RF sputtering. As a result, low emissivity glass was produced according to embodiment 1.

Where, a sputter chamber was first evacuated until a process pressure in the sputter chamber reaches $5 \times 10^{-6}$ Torr. A process gas was then injected into the sputter chamber and the sputter chamber was kept at a process pressure of $5 \times 10^{-2}$ Torr. The process was carried out at the vacuum condition of $5 \times 10^{-2}$ Torr. RF (Radio Frequency, 13.56 MHz) Power was supplied as applied power.

In addition, a composite metal oxide ($TiCeO_x$) comprising titanium oxide 85 and cerium oxide 15 by weight was used as a target material of the first dielectric layer and the second dielectric layer.

The thickness of layers of low emissivity glass produced like this was measured using an optical profiler.

TABLE 1

| A. | | | | |
|---|---|---|---|---|
| | Target material | Process gas (charges) | Applied power (w/cm2) | Thickness (nm) |
| Undercoat (SiN) | Si | Ar 10 sccm N2 30 sccm | 2.7 | 14 |
| Fist dielectric layer (TiCeOx) | TiCeOx | Ar 30 sccm O2 15 sccm | 2.7 | 24 |
| Low emissivity layer (Ag) | Ag | Ar 30 sccm | 1.1 | 11 |
| Barrier layer (NiCr) | NiCr | Ar 30 sccm | 1.1 | 1.5 |
| Second dielectric layer (TiCeOx) | TiCeOx | Ar 30 sccm, O2 15 sccm | 2.7 | 12 |
| Overcoat layer (SiN) | Si | Ar 10 sccm, N2 30 sccm | 2.7 | 36 |

COMPARATIVE EXAMPLE 1

Except that titanium oxide (TiOX) was used as target material of the first dielectric layer and the second dielectric layer instead of TiCeOX, comparative example 1 was carried out under the same conditions as those of embodiment 1 of the invention. Low emissivity glass was obtained according to conditions of comparative example 1.

Testing Items

1. Measurement of Optical Performance and Thermal Insulating Properties

Optical performance of low emissivity glass according to embodiment 1 was measured in the wavelength range of 300 nm to 2100 nm with section width of 1 nm, using the spectrophotometer (model Shimazu solid spec 3700). Visible light transmissivity and refractivity, and solar transmissivity and refractivity respectively were calculated according to KSL 2541. Emissivity was measured using an emissivity measurement apparatus (INGLAS TIR 100-2)

Thermal insulating properties were calculated using Window 5.2 Program with optical characteristics obtained through measurements described above. The results were shown in Table 2.

TABLE 2

| | OPTICAL PERFORMANCE | | | | | | | | |
|---|---|---|---|---|---|---|---|---|---|
| | VISIBLE LIGHT (%) | | | | | SOLAR RADIATION (%) | | | THERMAL |
| | VISIBLE LIGHT | | | REFLECTIVITY | | | REFLECTIVITY | | INSULATING |
| SAMPLE | TRANS-MISSIVITY | HAZE | TRANS-MISSIVITY | COATING FACE | GLASS FACE | TRANS-MISSIVITY | COATING FACE | GLAS FACE | PROPERTIES EMISSSIVITY |
| EMBODIMENT1 | 80.5 | 0.54 | 80.7 | 6.41 | 7.25 | 57.5 | 19.3 | 13.8 | 0.076 |

2. Chrominance Comparison

Chrominance of low emissivity glass according to embodiment 1 of the invention and comparative example 1 was compared and the result thereof was shown Table 3.

TABLE 3

| | Chrominance | | | | | |
| --- | --- | --- | --- | --- | --- | --- |
| | Coating face | | | Glass face | | |
| Sample | L* | a* | b* | L* | a* | b* |
| Embodiment1 | 73.43 | −5.12 | 1.02 | 75.31 | −5.09 | 0.68 |
| Comparative1 | 71.11 | −5.81 | 0.07 | 71.78 | −6.02 | −1.78 |

3. Deposition Rate Measurement

Figure 2:
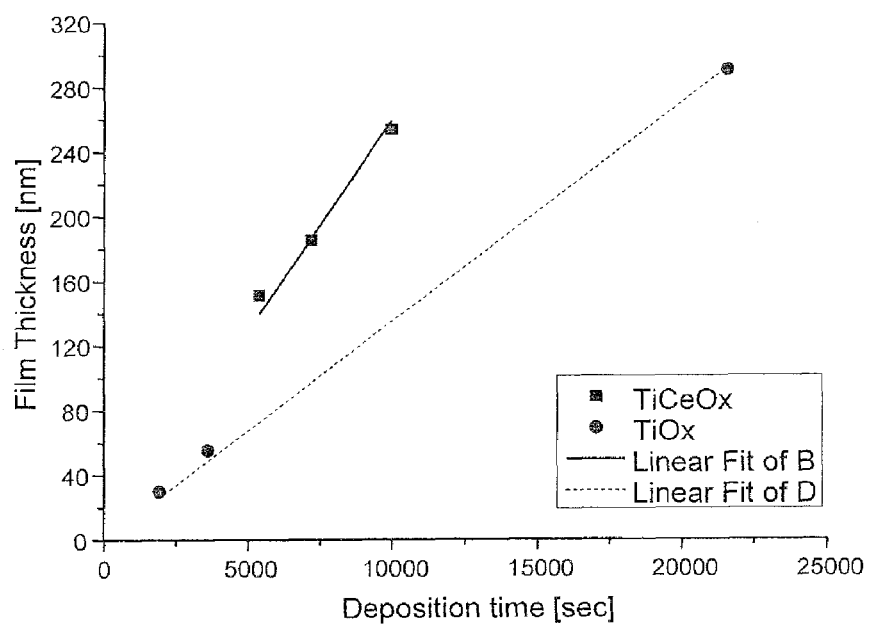
FIG. 2 is a graph representing a change of thickness depending on the time of deposition of low emissivity glass according to embodiment 1 of this invention, and low emissivity glass according to a comparative example 1.

In order to measure a deposition rate of the dielectric layer, deposition was carried out at a process time of 3 conditions. The thickness was measured and a liner fit for three points was then performed. As a result, the deposition rates of the dielectric layer in the process of producing low emissivity glass according to embodiment 1 of this invention and comparative example 1 were 0.0135 nm/sec and 0.0259 nm/sec, respectively as shown in FIG. 2.

4. Refractive Index Measurement

Figure 3:
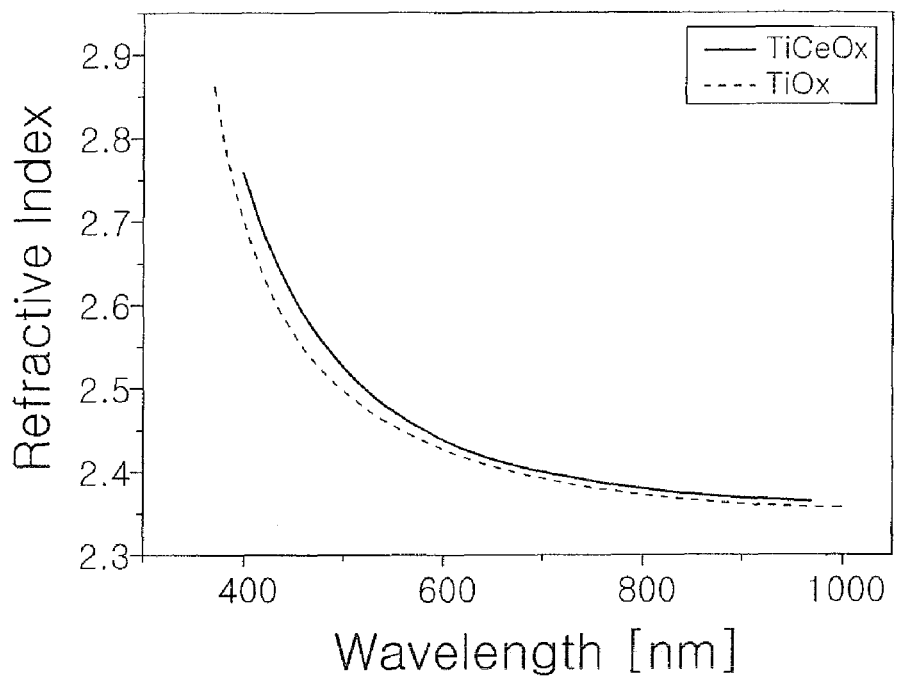
FIG. 3 is a graph representing a change of refractive index per a range of wavelength for dielectric layer of low emissivity glass according to embodiment 1 of this invention, and for dielectric layer of low emissivity glass according to a comparative example 1.

Refractive indexes for dielectric layers of low emissivity according to embodiment 1 of the invention and comparative example 1 respectively were measured using Ellipsometry and the result thereof was shown in FIG. 3.

Referring to FIG. 3, the dielectric layer included in low emissivity glass according to embodiment 1 exhibited high refractive index in the range of visible light of 380 nm to 780 nm, compared to dielectric layer included in low emissivity glass according to comparative example 1. In particular dielectric layer included in low emissivity glass according to embodiment 1 exhibited refractive index of 2.473 and dielectric layer included in low emissivity glass according to comparative example 1 exhibited refractive index of 2.455, for visible light of the wavelength of 550 nm

5. Comparison of Visible Light Transmissivity

Figure 4:
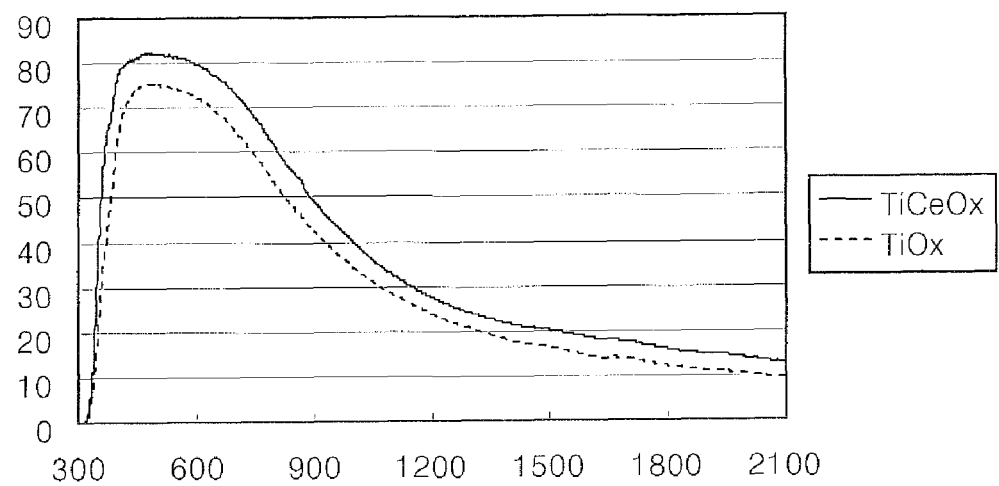
FIG. 4 is a graph representing a visible light transmissivity per a range of wavelength of low emissivity glass according to embodiment 1 of this invention, and of low emissivity glass according to a comparative example 1.

A graph comparing a visible light transmissivity of low emissivity glass according to embodiment 1 of the invention, and comparing that of low emissivity glass according to a comparative example 1 was shown FIG. 4. Referring to FIG. 4, low emissivity glass according to embodiment 1 of the invention exhibited visible light transmissivity about 5% higher than that according to a comparative example 1.

While the present invention has been described with respect to the specific embodiments, it will be apparent to those skilled in the art that various changes and modifications may be made without departing from the spirit and scope of the invention as defined in the following claims.

The invention claimed is:

1. A low emissivity glass comprising:
 a low emissivity layer containing electrically conductive metal;
 a dielectric layer comprising a composite metal oxide formed on one side of the low emissivity layer;
 a dielectric layer comprising a composite metal oxide formed on the other side of the low emissivity layer,
 wherein the composite metal oxide in the dielectric layers is expressed by a following chemical formula 1:

$TiCeO_x$     [Chemical Formula 1]

wherein Ti is titanium element, Ce is cerium element, and Ox is an oxide, wherein the composite metal oxide comprises 85 to 90% titanium oxide and 10 to 15% cerium oxide by weight,
 wherein an emissivity of the low emissivity glass is 0.01 to 0.3, and visible light transmissivity of the low emissivity glass is 75% or more, and the thickness of the low emissivity layer is 8 to 35 nm, and
 wherein the dielectric layers each have a refractive index of 2.4 to 2.8, for visible light.

2. The low emissivity glass of claim 1, wherein the electrically conductive metal comprises at least one species selected from the group consisting of silver, copper, gold, aluminum, and platinum.

3. The low emissivity glass of claim 1, wherein the dielectric layer formed on the one side of the low emissivity is a first dielectric layer formed on the lower surface of the low emissivity layer and the dielectric layer formed on the other side of the low emissivity layer is a second dielectric layer formed on the upper surface of the low emissivity layer.

4. The low emissivity glass of claim 3, wherein the first dielectric layer and the second dielectric layer, respectively have a thickness of 10 nm to 100 nm.

5. The low emissivity glass of claim 3, further comprising a barrier layer interposed between the low emissivity layer and the second dielectric layer.

6. The low emissivity glass of claim 3, further comprising an overcoat layer formed on the upper face of the second dielectric layer.

7. The low emissivity glass of claim 3, further comprising an overcoat layer formed on a lower face of the first dielectric layer.

8. A method for producing the low emissivity glass according to claim 1, including depositing the dielectric layers using the composite metal oxide formed on both sides of the low emissivity layer containing the electrically conductive metal and expressed by the following chemical formula 1:

$TiCeO_x$     [Chemical Formula 1]

wherein Ti is titanium element, Ce is cerium element, and $O_x$ is an oxide,
 wherein the composite metal oxide comprises 85 to 90% titanium oxide and 10 to 15% cerium oxide by weight,
 wherein an emissivity of the low emissivity glass is 0.01 to 0.3, and visible light transmissivity of the low emissivity glass is 75% or more, and the thickness of the low emissivity layer is 8 to 35 nm, and
 wherein the dielectric layers each have a refractive index of 2.4 to 2.8, for visible light.

9. The method according to claim 8 wherein the deposition is performed at a process pressure of $5 \times 10^{-2}$ Torr to $5 \times 10^{-8}$ Torr under vacuum condition.

10. The method according to claim 8 wherein the deposition is performed with introduction of process gas comprising argon gas at a flow rate of 20 sccm to 40 sccm and oxygen gas at a flow rate of 10 sccm to 20 sccm.

11. The method according to claim 8 wherein the deposition is performed using a plasma sputtering.

12. The method according to claim 11 wherein the deposition is performed at applied power of 1 w/cm² to 5 w/cm².

* * * * *